United States Patent [19]
Grundström et al.

[11] 3,972,294
[45] Aug. 3, 1976

[54] PLANTING MACHINE

[76] Inventors: Erik Hilding Grundström; Göte Einar Grundström; Ivar Waleij, all of 8 Sockenvagen, Dorotea, Sweden, 91070

[22] Filed: Oct. 21, 1974

[21] Appl. No.: 516,762

[30] Foreign Application Priority Data
Oct. 31, 1973 Sweden .............................. 7314795

[52] U.S. Cl. ........................................ 111/3; 111/91
[51] Int. Cl.² .......................................... A01C 11/00
[58] Field of Search .............................. 111/3, 2, 91

[56] References Cited
UNITED STATES PATENTS

| | | |
|---|---|---|
| 1,098,416 | 6/1914 | Vega Y Vega .................... 111/3 UX |
| 2,223,559 | 12/1940 | Fleming .............................. 111/3 X |
| 2,776,633 | 1/1957 | Bible .................................... 111/3 |
| 3,815,524 | 6/1975 | Poll ..................................... 111/2 |

*Primary Examiner*—Stephen C. Pellegrino
*Attorney, Agent, or Firm*—Pierce, Scheffler & Parker

[57] ABSTRACT

The improved planting machine of the invention, which prepares a hole in the soil for a plant to be inserted therein, and thereupon places the plant in said hole and firms the soil about it, is characterized in that the machine has a planting member so actuated that during the act of planting the plant said member temporarily stands still in relation to the soil whilst the planting machine as a whole advances at its normal rate.

21 Claims, 4 Drawing Figures

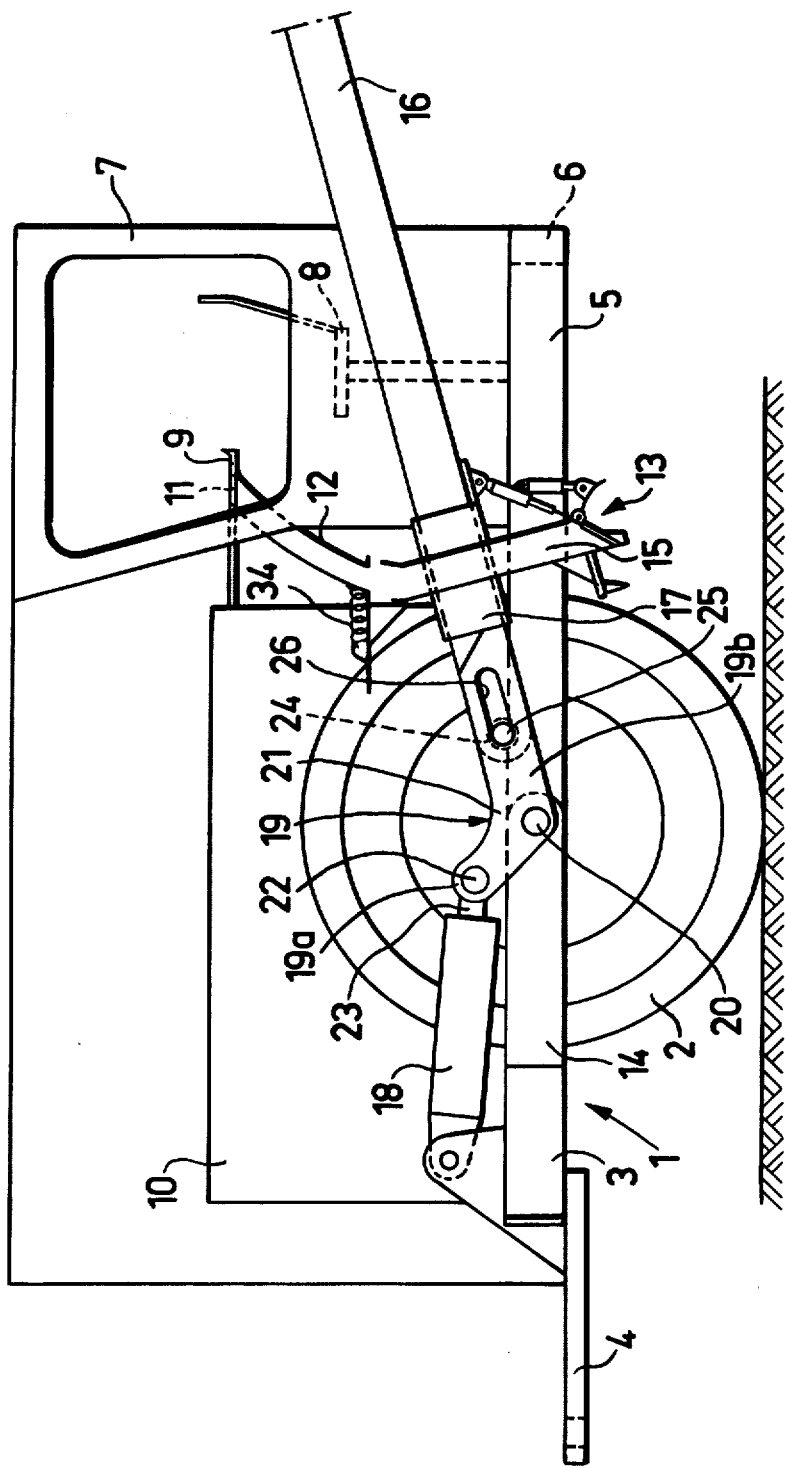

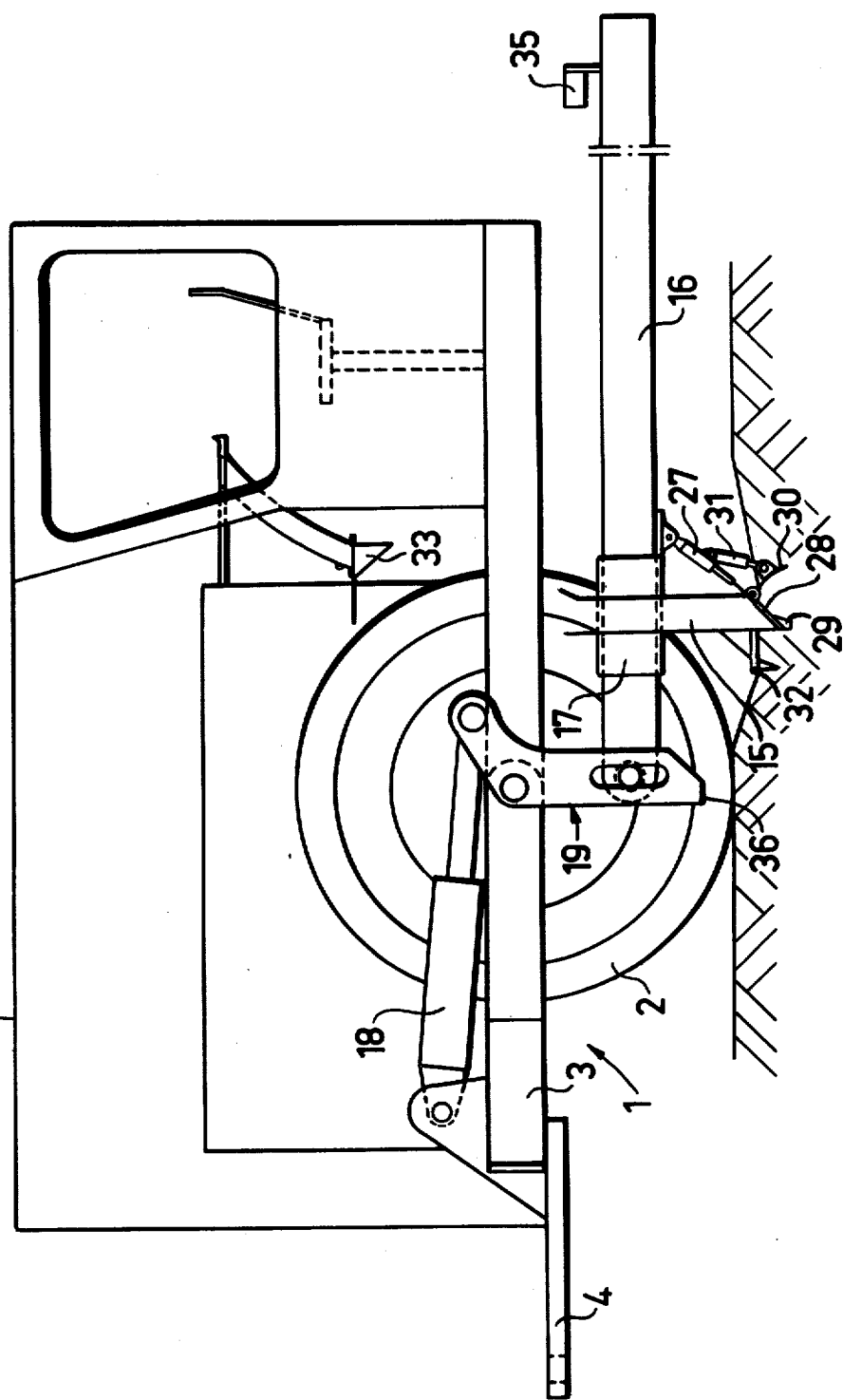

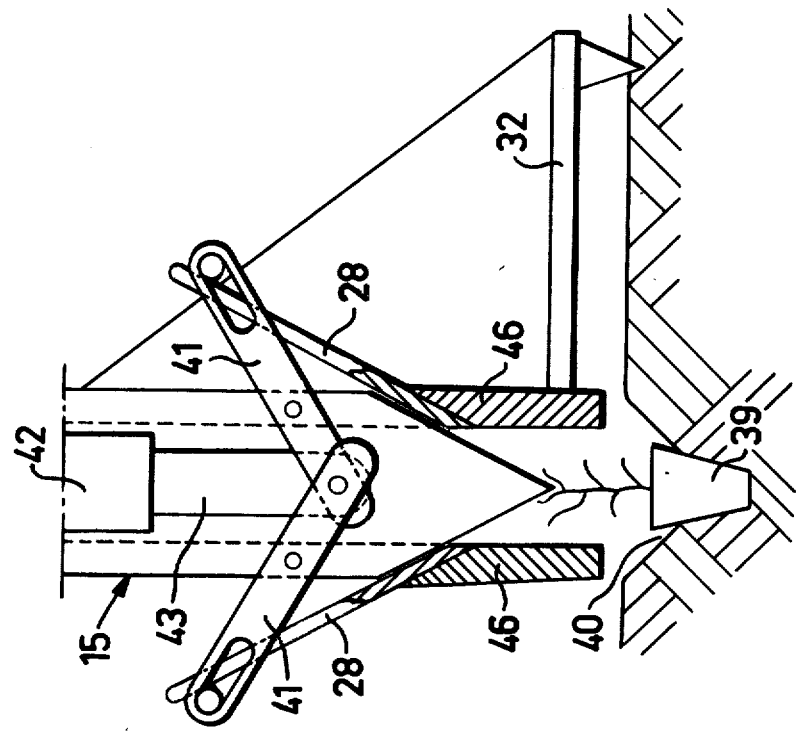
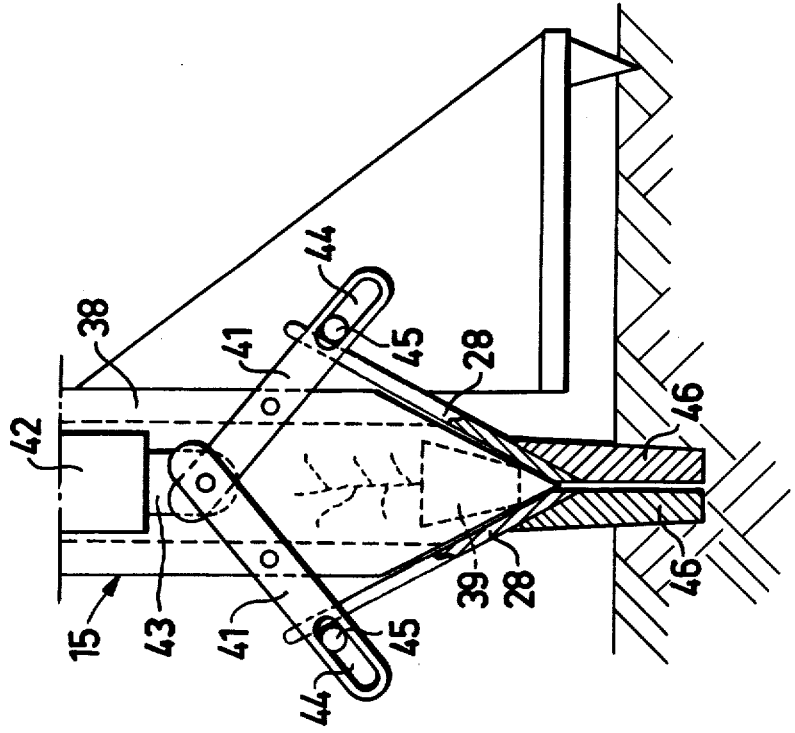

PLANTING MACHINE

This invention relates to an apparatus for placing plants in the soil and, more precisely, to a planting machine for primarily forest plants which is provided with at least one member adapted to be lifted and lowered in relation to the soil for making the holes into which the plants are to be placed.

When a forest area has been clear-felled, regeneration measures are being taken which usually imply the planting of plants of one to two years age. These plants are cultivated in special nurseries and delivered packed in small boxes in large transport containers. As an example can be mentioned, that in Sweden approx. 500 millions of plants are planted per year, and that this planting work is carried out substantially manually. This work is heavy, straining and also very tedious. In view of today's cost situation per day-work the costs of manual planting are very high and in many cases so high that a great number of owners of small forest areas prefer not to cut old forest. It was found, thus, that large forest areas have not been utilized in a manner satisfactory to forestry. It is a.o. for this reason, that there is a demand of mechanizing the planting operations.

Attempts have been made to mechanize the planting proper of the plants in the soil, as a result of which the so-called planting ploughs came about. At these planting ploughs the plough member proper is pivotally suspended in a place obliquely in front of and above the plough point and placed below a spring and hydraulic force, which normally acts downward and by means of which the plough is pressed down into the soil whilst the machine advances. This type of plough usually lacks the possibility of warding off an obstacle in the soil, e.g. large stones and roots, and is, therefore, less suitable for planting in a stony and scrubby terrain. A further disadvantage of these known planting ploughs is that the planted plants cannot be clamped satisfactorily due to the advancing of the plough during the planting operation.

The object of the present invention, therefore, is to eliminate the aforesaid disadvantages of the known planting ploughs and to produce a planting machine of such a nature, that it is not affected appreciably by obstacles in the soil and renders it possible that the plant inserted in the soil is subjected to a necessary clamping operation. This object is achieved thereby that the planting machine according to the invention has been given the characterizing features defined in the claims.

The invention is described in the following in greater detail, with reference to the accompanying drawings, which show by way of example an embodiment of the planting machine according to the invention, in which FIG. 1 is a side-view of the selected embodiment in a position of feeding a plant, FIG. 2 is a side-view of the same planting machine, but in a position of discharging a plant into a hole made by the machine in the soil, and FIGS. 3 and 4 show a modified embodiment of the planting dibble comprised in the planting machine according to the invention.

The embodiment shown of the machine according to the invention is intended to be coupled behind an off-road traction vehicle of some kind, which is per se known and not shown in the drawings, but it may in other embodiments also be self-propelling or constitute the rear part of a centrally steered cross-country vehicle. The machine according to the embodiment shown is built up on a frame 1, which is provided with wheels 2 in a one-axle arrangement, as shown in the drawings, or alternatively in a bogie arrangement. Also tracks, driven or not, may be used. The frame 1 comprises a transverse beam 3, at which a drawing bar 4 is secured, and at least two longitudinal frame beams 5 of relatively great length, one of which is shown in the drawings. Said frame beams 5 are fastened with one end at the transverse beam 3 on both sides of and suitably spaced from the longitudinal line of symmetry of the machine, and united relative one another by means of some transverse stays in spaced relationship, one of which is indicated at 6. On the longitudinal frame beams 5, at the rear portion of the frame, a cabin 7 is provided which is equipped with a seat 8 for the planting operator and with a plant feed table 9 within reach of the operator on said seat 8. Between said cabin 7 and the forward transverse beam 3 of the frame the wheels 2 are mounted in a manner, which is per se known and not described in greater detail in this conjunction. The wheels, however, as is apparent from the drawings, must be placed outside the respective longitudinal frame beam 5, so that the space between the wheels 2 can be utilized efficiently as a storage space for the plants to be planted, which generally are delivered from the nursery in transport containers holding a plurality of plant boxes stacked in rows with intermediate space between the boxes in each stack.

In the drawings, such a transport container designated by 10 is shown disposed on the frame 1 between the wheels 2 and in front of the cabin 7. Though not being directly apparent from the drawings, the container 10 may be located on a table, which is supported on the frame and be liftable and lowerable, for example hydraulically, so that the boxes arranged on different levels can be brought onto the same level with the plant feed table 9, thereby eliminating the relatively heavy work of lifting a box from the container to the table 9. In order to facilitate still more the plant operator's job, the plant feed table 9 can be provided with or designed as a conveyor which can be extended, for example telescopically or in another way, so as to be movable beneath at least one box, preferably the uppermost box in each stack, for transporting said box from the respective stack to a position on the plant feed table 9, from which the operator easily can take the plants out of the box and insert them one at a time in plant feed holes 11 in the table 9. It is, however, to be observed in this conjunction that the transport containers 10 used must be so constructed that their wall facing the cabin 7 can be removed.

From each plant feed hole 11 in the table 9, a down-feed pipe 12 or a down-feed hose is drawn each to its respective planting unit 13, which units may be comprised in the machine according to the invention in a number of one to six, preferably two to four. The machine here described is arranged for two planting units 13, of which only one is shown in the drawings. Supporting beams 14 corresponding in number to the number of planting units 13 are provided for suspending said units. Said supporting beams, when their number is an even number, must be arranged symmetrically and with an equal number on both sides of the central line of the machine. At the embodiment shown, which comprises two planting units 13, the supporting beams 14 are arranged each at its respective end of the transverse beams 3 and spaced substantially equally from the central line of the machine, in such a manner, that the total distance between the two supporting beams 14, and thus between two planting units 13, shall correspond approximately to the width of the spacing, according to which the plants are to be planted. For rendering it possible to change the spacing, the supporting beams 14 of the planting units can be arranged movable along the transverse beam 3 and lockable in each of the positions they are set. In the case of an uneven number of planting units, which is suitable for planting in triangular spacings, one of the units may be placed on the central line of the machine, preferably below or behind the cabin 7.

Each planting unit 13 comprises a planting dibble 15, which is supported on a carriage 17 movable relative to the machine along a traveling arm 16, on which the carriage is shown arranged in the form of a sleeve. The traveling arm 16 and also the carriage 17 have such a cross-section, that the carriage is prevented from rotating in relation to the traveling arm 16. The cross-section may be e.g. square, rectangular or of another polygonal shape. In order to facilitate the movement of the carriage 17 along the traveling arm 16, the carriage is provided with rolls or other friction reducing members on one or more sides and preferably on all sides facing toward the traveling arm. At its forward end in the advancing direction of the machine, the traveling arm 16 is hingedly connected to a link member 19, which is actuated by a piston-cylinder arrangement 18 and supported pivotally about an axle 20 at the rearward free end of the supporting beam 14, which like the other supporting beams 14 comprised in the frame is substantially shorter than the longitudinal beams 5 of the frame.

The link member 19 at the embodiment shown has the form of an angular lever, the two lever arms of which are designated by 19a and, respectively, 19b and consist of two spaced interconnected side pieces 21 each located on one side of the supporting arm 14 and also of the traveling arm 16. The shorter lever arm 19a of the link member is hingedly connected by a joint (axle) 22 to the piston rod 23 of the piston-cylinder arrangement, and its longer lever arm 19b is hingedly connected to the traveling arm 16 by means of a ball joint, the ball 24 of which is located in a seat provided in the traveling arm end facing toward the link member. The pins 25 projecting in lateral direction from the ball 24 extend into slots 26 in the side pieces 21 of the link member. In the position shown in FIG. 1, the traveling arm 16 is supported, besides by the pins 25 of the ball joint engaging with the slots 26 of the link member, by a bottom plate (not shown in detail in the Figures), which unites the two side pieces 21 of the link member, and against which the arm 16 in said position rests with its end portion being in the link member. At least this end portion must have a width, which is smaller than the distance between the side pieces 21 of the link member, so that the traveling arm 16, at least when being in the position shown in FIG. 2, is given the possibility of moving in the horizontal plane to a certain limited extent about the ball joint 24, 25. The lever arm 19b of the link member being open upwardly, the traveling arm 16 can be moved by means of the link member 19 and piston-cylinder arrangement 18 from the upper position shown in FIG. 2, in which position the traveling arm 16 supported by the planting dibble 15, which is lowered into the soil and shown in the form of a pipe with a substantially funnel-shaped upper end and a lower end beveled to a point, extends substantially in parallel with the soil plane, and vice versa. Due to the movability of the carriage 17 with the planting dibble 15 along the traveling arm 16 it is, thus, possible in the position shown in FIG. 2 that the carriage 17 with the planting dibble lowered into the soil performs a movement relative to the traveling arm 16, and thereby to the remaining machine, from the position, in which the planting dibble 15 is lowered into the soil, to the position, in which the planting dibble 15 is lifted up by means of the piston-cylinder arrangement 18 and link member 19. This implies, in other words, that the planting dibble 15 after having been lowered into the soil stands still in relation to the soil whilst the machine advances. This standstill period, which depends on the speed of the machine and on the length of the traveling arm, must be so long that a plant safely can be placed into the hole established by the planting dibble, before the dibble is lifted up again. For being able to control the planting operation of a plant in a hole in the soil as efficiently as possible, the planting dibble 15 is provided at its beveled lower end with a slide cover 28 actuated by a piston-cylinder arrangement 27. This slide cover is provided at its forward end with a shoulder 29, which in the closed position of the cover projects in the extension of the planting dibble and upon opening of the slide cover 28 for planting a plant, which in this position rests on the cover, reams the hole established by the dibble 15 proper for the plant, in such a way, that said shoulder takes along and/or presses aside the soil. This soil thus pressed aside or taken along is then utilized for clamping the plant inserted into the hole. For effecting said clamping, a support and clamping plate 30 is pivotally mounted at the lower rear end of the planting dibble and actuated by means of a piston-cylinder means 31, in such a manner, that it is pivoted forward by said piston-cylinder means and thereby clamps a planted plant. Said clamping plate, in the position shown in the Figures, also acts as a support plate to prevent the dibble 15 from penetrating too deep into the soil. The planting dibble may for this purpose also be provided with a fixed support plate 32, as shown in the Figures, which together with the plate 30 thus determines the distance to which the dibble can be inserted into the soil. After the planting and clamping of a plant, the piston-cylinder means 18 is automatically switched in, for example by means of the carriage 17 actuating a limit switch 35 disposed at the rear end of the traveling arm 16, and lifts the planting dibble from the soil by moving the traveling arm 16 with the help of the link member 19 from the position shown in FIG. 2 to the position shown in FIG. 1. During this movement, thus, the traveling arm 16 is caused to assume a position inclined downwardly-forwardly to the soil plane, and the carriage 17 may hereby move by itself forward along the traveling arm to its forward position shown in FIG. 1. Immediately prior to the arrival of the carriage at this position, the planting dibble 15 actuates with its upper end a cover 33 closing the down-feed pipe 12 (see FIG. 2) and displaces this cover against the action of a return spring 34 (FIG. 1) to open the connection between the feed table 9 and the planting dibble 15 so that a new plant can be inserted to the lower end of the planting dibble which in this position is closed.

In order to safely effect the return of the carriage 17 to its forward position, which in the Figures is defined by the free end 36 of the link member, and render it impossible for the carriage to move out of this position unintentionally, the greatest angle of the traveling arm to the horizontal plane must be so great that the traveling arm in its upper position always assumes a position slightly inclined forwardly-downwardly to the soil, independently of the soil slope. In FIG. 1 this angle is shown to be about 35°. If this angle is some case should prove to be too small for returning the carriage to or to prevent an unintentional movement of the carriage from its forward position, the carriage may be returned by a return means, not shown in the Figures, either in the form of a spring or a hydraulic cylinder, which also must be so designed as to retain the carriage in its forward position.

At its embodiment shown, the machine is provided with a sunshade 37 to protect the plants against sunshine and being dried out. When applying the machine, the operator inserts a plant into each of the feed holes 11 in the table. From the beginning, when the traveling arm of each planting unit is in the position shown in FIG. 1, the plants rest on the slide cover 28 of the respective planting dibble. When the operator finds a suitable place for planting a plant, he actuates, for example, an electrically controlled hydraulic valve, which switches in the piston-cylinder means 18. The traveling arm 16 is hereby moved to the position shown in FIG. 2, and the planting dibble penetrates into the soil until the support plates 32 and 30 prevent a further penetration. At the same time as the planting dibble moves out of the downfeed pipe 12, the spring 34 returns the cover and closes the downfeed pipe 12 so that the operator can insert a new plant down into the pipe 12. When the planting dibble 15 has been pivoted down into the soil to a sufficient degree, the slide cover 28 is opened automatically by the piston-cylinder means 27, and the plant in the planting dibble can fall down into the hole thus formed. Thereafter the piston-cylinder means 31 is switched in automatically to pivot the clamping plate 30 against the inserted plant for its clamping. During this time the machine advances, and when it causes the limit switch 35 to contact the carriage 17, the piston-cylinder means 18 again is switched in to lift the planting dibble and return it as well as the traveling arm to the position shown in FIG. 1, in which position a new plant is fed into the planting dibble 15, which therebefore had been closed by return of the slide cover 28 and clamping plate 30. The planting dibble standing still during the planting operation proper, the machine according to the invention is not affected by obstacles in the soil, because the operator in advance can select a suitable place for planting a plant. Owing to the standstill of the planting dibble during the planting operation proper, the plant thus planted can also be clamped, which has become possible first by this invention.

FIGS. 3 and 4 show in a schematic way a modified embodiment of the lower portion 38 of the planting dibble 15 in a position during its penetration into the soil and, respectively, in a position after a plant 39 had been placed in the hole 40 made by the planting dibble in the soil. At this embodiment, the tubular planting dibble 15 is beveled on two sides to a point in the centre of the dibble and provided with two slide covers 28, one on each side. These two slide covers 28 are coupled together one to the other each by a hinged arm 41 pivotally mounted on the planting dibble 15 so as to move simultaneously from closed to open position, and vice versa. This movement is effected by help of a piston-cylinder means 42, at the piston rod 43 of which the two hinged arms 41 are pivoted. The connection between the slide cover 28 and associated hinged arm 41 consists of an oblong hole 44 in the hinged arm 41 and a pin 45 fastened on the slide cover which engages with said oblong hole. Also at this embodiment the slide cover is provided with a shoulder or a projection 46, preferably of semi-circular or semi-conical shape. The two projections 46 form the member, which makes the hole 40 in the soil for the plant 39 being in the planting dibble 15 in FIG. 3 for being planted. Upon opening of the slide covers 28, the projections 46 are caused to move upwards at the same time as they separate and thereby compress the soil about the hole 40 and simultaneously widen the hole upwardly to a shape corresponding to the plant 39 rooted in a clod, so that the plant inserted into the hole stands safely in the hole without further measures. A clamping operation in its proper sense is not necessary, but if it would be required, for example for other types of plants, clamping plates of the kind shown in FIGS. 1 and 2 can be provided also at this modified embodiment, which also is provided with a fixed support plate 32.

The present invention is not restricted to the embodiments described above and shown in the drawings, but can be altered in many different ways within the scope of the claims.

What we claim is:

1. A planting machine having at least one liftable and lowerable planting member for dropping a plant, held therein, into a hole in the ground by the planting member, said planting member in its position lowered into the soil standing still in relation to the soil during the normal advancing movement of the machine, characterized in that the planting member (15) is slidably mounted on and movable along an essentially straight arm means (16) extending in the longitudinal direction of the machine, said arm means being pivotally mounted on said machine for movement in a vertical plane; means for moving said arm means at least in an essentially vertical plane around said pivot (20) in front of the planting member from a position substantially in parallel with the soil, in which position the planting member is kept lowered into the soil and standing still in relation to the soil through the act of the relative mobility between the planting member and the arm means, to a position inclined obliquely forward to the soil for lifting and repositioning the planting member to its starting position on the arm means (16).

2. A planting machine including a frame-supporting vehicle adapted for movement over the ground, said planting machine comprising arm means reciprocatingly secured on said frame and extending in the longitudinal direction of the machine, said arm means including a carriage mounted on and reciprocatable along said arm means;

a source of plants on said planting machine;

at least one liftable and lowerable planting member carried on said carriage, said planting member comprising means for opening a hole in the ground and dropping a plant, held therein, into the hole, said plant having been fed into said hole-opening means by an operator;

said arm means being movable about a point in front of said planting member from a position substantially in parallel with the ground to a position inclined obliquely forward with respect to the ground; and means for translating said carriage with its planter member forwardly and downwardly and rearwardly and upwardly, whereby to force an end of said planting member into the ground and with it forming a hole in the ground and dropping a plant into the hole so formed.

3. A planting machine as defined in claim 2, characterized in that the planting member is a generally cylindrical dibble.

4. A planting machine as defined in claim 3, in which two slide covers are provided for closing the downwardly open end of the planting dibble, characterized in that the two slide covers are coupled together one to the other by means of links for simultaneous movement from closed to open position.

5. A planting machine as defined in claim 2, characterized in that the planting member at its lower end is closable by means of at least one slide cover.

6. A planting machine as defined in claim 5, characterized in that each slide cover is provided with a shoulder projecting in closed position of the cover in the extension of the planting member.

7. A planting machine as defined in claim 2, characterized in that the planting member in its starting position on the arm is connected to a downfeed pipe or hose extending from a plant feed table.

8. A planting machine as defined in claim 7, characterized in that the downfeed pipe is closable by a cover adapted to be moved to open position by the planting member and to closed position by a return means.

9. A planting machine as defined in claim 2, further comprising a return means, mounted on said frame for returning the carriage to and retaining it in starting position on the arm.

10. A planting machine as defined in claim 9, wherein said return means is telescopic.

11. A planting machine as defined in claim 9, wherein the return means comprises a spring.

12. A planting machine as defined in claim 9, wherein the return means comprises a piston-cylinder means.

13. A planting machine as defined in claim 12, characterized in that the carriage on at least one of its sides facing toward the arm is provided with friction reducing means.

14. A planting machine as defined in claim 2, wherein the carriage is a sleeve non-rotatively disposed on the arm with a cross-sectional shape corresponding to that of the arm.

15. A planting machine as defined in claim 14, wherein said arm and said sleeve have a rectangular cross-sectional shape.

16. A planting machine as defined in claim 2, wherein said hole-opening and plant-placing means comprises a generally tubular planting dibble beveled on two sides to a point in the center of the dibble, said dibble having two slide covers one on each side of the dibble, said slide covers being coupled one to the other by hinged arms pivotally mounted on the dibble for simultaneous movement from closed to open position and vice versa, said covers being fixedly associated with a pair of penetration means supportive when in the closed position of a plant and spreadable apart with said cover means to penetrate the ground and to form a planting hole in the ground, said penetration means, when in spread-apart position, permitting discharge of a plant into the freshly-made hole.

17. A planting machine as defined in claim 2, characterized in that the planting member at its lower end is provided with a plate pivotal to and from the planting member for clamping a plant inserted in a hole by the planting member.

18. A planting machine as defined in claim 2, characterized in that the arm movably supporting the carriage with the planting member is hingedly connected at one end to a link member in the form of an angular lever, which is pivotal about an axle provided approximately in the angle of the lever.

19. A planting machine as defined in claim 2, characterized in that the link member and the arm are interconnected by a ball joint.

20. A planting machine as defined in claim 2, characterized in that the planting member is beveled at its lower end to a point.

21. A hole-opening and plant-placing device which comprises a generally tubular planting dibble beveled on two sides to a point in the center of the dibble, said dibble having two slide covers one on each side of the dibble, said slide covers being coupled one to the other by hinged arms pivotally mounted on the dibble for simultaneous movement from closed to open position and vice versa, said covers being fixedly associated with a pair of penetration means supportive when in the closed position of a plant and spreadable apart with said cover means to penetrate the ground and to form a planting hole in the ground, said penetration means, when in spread-apart position, permitting discharge of a plant into the freshly-made hole, and means for actuating said arms.

* * * * *